United States Patent [19]

Stratichuk

[11] 4,373,303
[45] Feb. 15, 1983

[54] IN-GROUND TRAILER POST ASSEMBLY

[76] Inventor: Joseph Stratichuk, 4226 Batchelor Ave., Winnipeg, Manitoba, Canada

[21] Appl. No.: 164,885

[22] Filed: Jun. 30, 1980

[51] Int. Cl.³ .................. E04H 12/22; E04H 12/00; B60R 27/00
[52] U.S. Cl. ................................. 52/40; 52/27; 52/165; 52/297
[58] Field of Search ............... 52/27, 40, 296, 297, 52/165; 280/1, 507, 763

[56] References Cited

U.S. PATENT DOCUMENTS

| 264,998 | 9/1882 | Barnes | 52/297 |
|---|---|---|---|
| 278,389 | 5/1883 | Bigelow | 52/165 X |
| 412,498 | 10/1889 | Hall | 52/40 |
| 692,841 | 2/1902 | Fenton | 52/296 X |
| 3,238,678 | 3/1966 | Barnett | 52/155 |
| 3,797,283 | 3/1974 | Honer | 52/40 |
| 3,857,575 | 12/1974 | Lee | 52/40 |

Primary Examiner—Alfred C. Perham
Attorney, Agent, or Firm—Stanley G. Ade

[57] ABSTRACT

A tubular portion is embedded vertically into the ground and has a screw threaded upper end substantially flush with the surface of the ground. A screw threaded stem or post detachably engages the upper end when a trailer is to be parked thereon, and the stem is provided with the ball portion of a trailer coupler assembly on the upper end thereof engageable by the coupler portion of the trailer coupler assembly situated on the front end of the hitch frame. A padlock through the release lever prevents unauthorized removal of the trailer from the post and the post can be unscrewed and stored when the trailer is not parked at the post assembly.

5 Claims, 2 Drawing Figures

IN-GROUND TRAILER POST ASSEMBLY

BACKGROUND OF THE INVENTION

This invention relates to new and useful improvements in trailer post assemblies and although it is designed primarily for use with travel trailers, tent trailers, utility trailers and the like, particularly when parked at residences or the like, nevertheless it will be appreciated that it can be used in trailer parks, storage areas or in any location where it is desired to store a trailer substantially level when not in use.

Conventionally, trailers, particularly lightweight trailers, are parked with the hitch frame engaged upon an oil drum, cement block, tree log or the like so that the trailer is parked in a substantially level position. When a travel trailer is parked under these circumstances and is being used, wheel jacks are utilized to steady the trailer, but such trailers are often provided with a stem which can be screwed upwardly or downwardly and which is situated in the hitch frame just rearwardly of the ball hitch portion.

Not only are such supports unsteady and unsafe, particularly when used upon uneven ground, but they also permit the trailer to be hitched to another vehicle for unauthorized removal. This theft of trailers is particularly prevalent with utility trailers, particularly those used for storing snowmobiles and other relatively expensive equipment.

Attempts have been made to provide hitch posts upon which such trailers may be engaged for storage and examples known to the applicant are those such as disclosed in U.S. Pat. Nos. 3,238,678, 3,527,355, 3,695,631, 3,717,362 and 3,857,575.

Pat. 3,695,631 merely shows a support member engaging the ground surface and is not of any particular interest.

The remaining patents all show telescopic devices and in particular, reference should be made to U.S Pat. Nos. 3,857,575 and 3,238,678. Both of these utilize a tubular receptacle engaged within the ground and having a post portion with a ball on the upper end thereof telescopically received within this tubular portion so that it may be stored within the below ground tubular portion when not in use and may be drawn upwardly and locked in position when it is desired to park a trailer thereto. However, although these may be satisfactory in warm climate areas or in areas during warm climatic conditions, nevertheless both of these devices would receive water from rain, drainage or the like which, particularly during the approach of cold water, may readily freeze so that when winter is at hand, it will be impossible to withdraw or retract the post portions thus making the devices completely unusable for the greater part of the year in many areas of the country.

For example, it is often desirable to use a trailer in the winter, particularly a trailer used for transporting snowmobiles and the like, and if the device of the prior art had filled with water and been frozen with the post in the uppermost position, it would be impossible to remove this post so that under the majority of circumstances, the trailer could not be removed from its stored location due to the fact that such trailers are usually backed into position.

Also, if it was desired to store a trailer with one of the devices of the prior art, and it had frozen in the retracted or telescoped position, it would be impossible to withdraw the post portion until the ground was completely thawed.

SUMMARY OF THE INVENTION

The present invention overcomes these disadvantages by providing a post portion which is easily removed and installed when desired regardless of the climatic conditions and in accordance with the invention there is provided an in-ground trailer hitch post assembly for travel trailers, utility trailers and the like which include a hitch frame extending therefrom with a hitch ball receiving cup assembly on the front end thereof; comprising in combination a ground engaging portion and a post portion detachably engaging portion and post portion detachably engaging the upper end of said ground engaging portion situated substantially flush with the ground surface when installed therein, said post portion including a hitch means secured to the upper end thereof detachably engageable with the ball receiving cup of the associated trailer, and a screw threaded lower end screw threadably engaging within said screw threaded tubular coupling portion.

Another advantage of the present invention is that with the ground engaging portion being situated flush with the ground surface, no interference with normal traffic is encountered when the post portion is removed. Furthermore, if the trailer is to be moved to another location it is only necessary to install a new ground engaging portion whereupon the original post portion can be used therewith.

A still further advantage of the present invention is to provide a device of the character herewithin described which is simple in construction, economical in manufacture, and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 2:
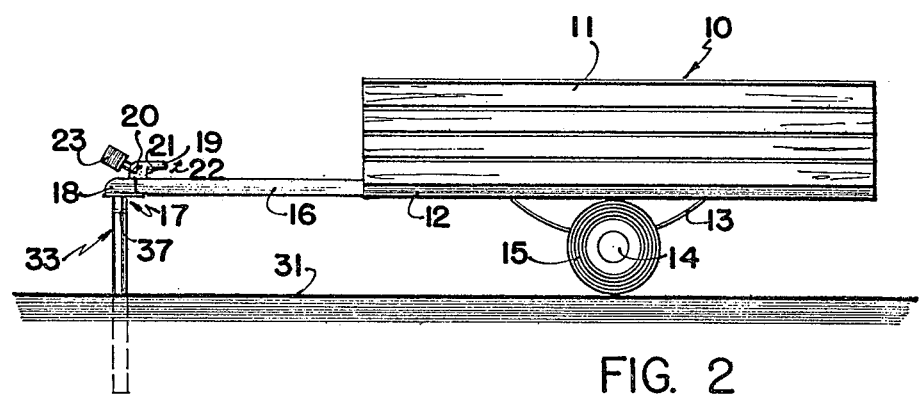
FIG. 2 is a side elevation showing the assembly installed with a utility trailer supported thereby.

Proceeding therefore to describe the invention in detail, reference should first be made to FIG. 2 in which 10 illustrates generally, a utility trailer having a box 11 supported upon a frame 12 with springs 13 supporting axle 14 upon which ground engaging wheels 15 are mounted, all of which is conventional. A hitch frame 16, also conventional, extends forwardly of the main frame 12 and terminates with a hitch coupling assembly collectively designated 17 on the front end thereof, said hitch coupling assembly being conventional. It includes a ball receiving cup 18 normally engageable over a ball portion of a hitch secured to the towing vehicle (not illustrated) and the cup 18 is engaged and released relative to the ball by means of a cam lever assembly 19 which includes an aperture or slot 20 therethrough and a cam release lever 21. When in the position shown in FIG. 2, the cup assembly is locked upon the ball and when it is desired to release same, the trigger 21 is actuated and the lever 19 is moved in an arc in the direction of arrow 22, once again all of which is conventional.

A padlock 23, engaged through the slot 20 when in the position shown in FIG. 2, prevents rotation of the lever 19 and hence release of the cup 18 so that the cup remains locked upon a ball until the padlock is removed.

Figure 1:
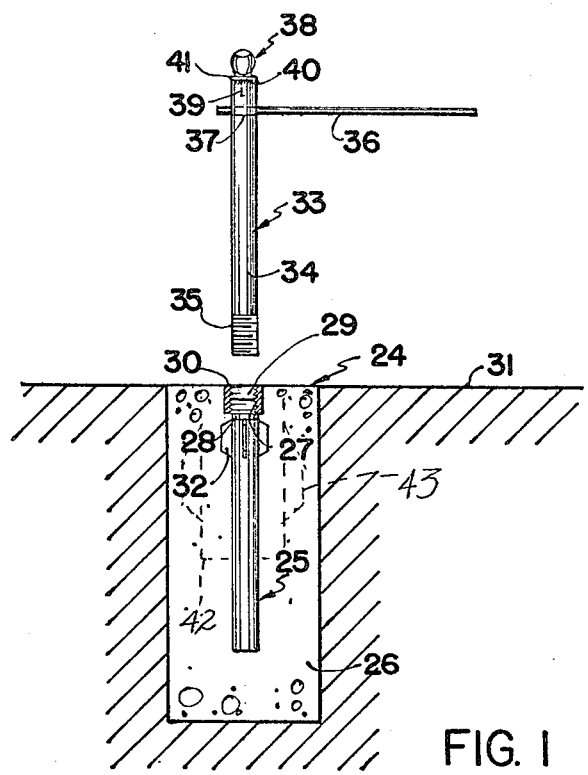
FIG. 1 is a partially exploded, partially cross sectioned view of the assembly per se.

The invention collectively designated 24 consists of a ground engaging portion collectively designated 25 which is preferably formed from an elongated tubular steel member embedded within the ground vertically and surrounded by concrete 26 as clearly shown in FIG. 1. In this embodiment, the upper end 27 of the tubular member 25 is screw threaded and receives a short sleeve coupling 28 which is screw threaded internally and is engaged by the screw threaded portion 27 so that the upper end 29 engages approximately half way through the coupling as clearly shown. When installed within the concrete 26, the upper end 30 of the coupling is preferably flush with the ground surface 31, whether this ground surface is gravel, hard top, grass, dirt or concrete.

Alternatively, the inner portion of the upper end of the member 25 may be screw threaded internally thus dispensing with the coupling 28 although the coupling method of construction is preferred.

Means are provided to prevent rotation of the ground engaging portion 25 during use, said means taking the form of one or more radially extending fins 32 extending from the outer surface of the tubular member 25 adjacent the upper end thereof. Alternatively, welded beads may be formed on the outer surface and may extend vertically for a short distance to serve a similar purpose. Any other anti-rotation method may be utilized.

The stem or post portion of the assembly is collectively designated 33 and preferably comprises a cylindrical post or tube 34 having a screw threaded lower end 35 which screw threadably engages within the upper end portion of the coupling 28 when installed and a cross bar or similar member 36 may detachably engage a cross bore 37 formed through the post 33 adjacent the upper end thereof. This bar 36 assists in the tightening or loosening of the screw threaded portion 35 of the post within coupling 28 and, of course, is detached when not in use.

A conventional hitch ball collectively designated 38 is engaged within the upper end 39 of the post 34 and is preferably welded into position as indicated by the annular welding line 40 between the upper end of the post 34 and the lower side of the flange 41 which forms part of the ball assembly 38.

In operation, and when it is desired to park a trailer at the hitch post assembly, the post portion 33 is screw threaded into the coupling 28 and tightened by bar 36 or the equivalent such as a conventional tire wrench (not illustrated).

The hitch cup 18 of the trailer is engaged upon the ball assembly 38 whereupon the lever 19 is moved to the locked position and preferably, a padlock 23 or the equivalent is engaged through the slot 20 to prevent actuation of the lever 19.

Under these circumstances, the trailer is parked safely and securely. Safely, because wind or inadvertent side pressure against the trailer will not disengage the hitch from the ball and securely, because it is impossible to steal the trailer unless the padlock is removed. While it is appreciated that the post 33 can be rotated relative to the cup 18, even if the post is unscrewed from the coupling 28, it cannot be removed from the cup 18 so that the trailer cannot be hitched to another vehicle and removed.

It will also be appreciated that even if snow or water engages within the portion 25, the upper end of the coupling is easily cleared if necessary so that the post can be screw threadably engaged therein regardless of weather conditions.

When locked by means of a padlock or the equivalent, theft is prevented and it will be appreciated that the length of stem or post 33 is governed by the type of trailer to be parked thereon.

The use of the device also prevents lightweight trailers from being moved by wind or gravity if parked on uneven ground, a common occurrence when the hitch frame is merely parked upon a temporary support.

The device is easily installed in any location and upon any surface and if it is desired to move the trailer from one location to another, only the ground engaging portion needs to be replaced as the post portion can be used in any ground engaging portion. It is particularly useful for storing trailers in off season and can be used in camp grounds or other locations as it assists in spacing out the parking or placing of such trailers in the designated areas.

Finally, as an alternative to the wings 32, a conventional paint can 42 may be used as shown in phantom in FIG. 1, with the base removed and opposing wings 43 formed in the wall by cutting the wall of the can and bending the wings outwardly.

This can is located concentrically around the ground engaging portion and is embedded in the cement and acts to prevent rotation of the tube. It also assists in preventing the cracking of cement around the top of the tube.

The device can also be used with boat trailers, snowmobile trailers and the like.

Since the various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An in-ground trailer hitch post assembly for travel trailers, utility trailers and the like which include a hitch frame extending therefrom with a hitch ball receiving cup assembly on the front end thereof; comprising in combination a ground engaging portion and a post portion detachably engaging the upper end of said ground engaging portion, said ground engaging portion including a screw threaded tubular coupling portion on the upper end of said ground engaging portion situated substantially flush with the ground surface when installed therein, said post portion including a hitch means secured to the upper end thereof detachably engageable with the ball receiving cup of the associated trailer, and a screw threaded lower end screw threadably engaging within said screw threaded tubular coupling portion, said ground engaging portion comprising an elongated member situated vertically within the ground when installed, said screw threaded tubular coupling portion being screw threadably engageable upon the upper end of said elongated member and terminating substantially flush with the ground surface.

2. The invention according to claim 1 which includes at least one anti-rotation means secured to and extending radially from adjacent the upper end of said ground engaging portion.

3. The invention according to claim 1 in which said hitch means comprises a hitch ball welded to the upper end of said post portion; and a transversely situated aperture formed through said post portion adjacent the upper end thereof to detachably receive means to rotate said post portion to engage and disengage same from said tubular coupling portion.

4. The invention according to claim 2 in which said hitch means comprises a hitch ball welded to the upper end of said post portion; and a transversely situated aperture formed through said post portion adjacent the upper end thereof to detachably receive means to rotate said post portion to engage and disengage same from said tubular coupling portion.

5. The invention according to claims 2, or 4 in which said anti-rotation means includes at least one fin secured to and extending radially from the outer wall of said ground engaging portion.

* * * * *